United States Patent

Saito et al.

(10) Patent No.: US 9,868,231 B2
(45) Date of Patent: Jan. 16, 2018

(54) POLYGLYCOLIC ACID MOLDED ARTICLE, COMPONENT FOR DOWNHOLE TOOL, AND METHOD OF PRODUCING POLYGLYCOLIC ACID MOLDED ARTICLE

(71) Applicant: Kureha Corporation, Tokyo (JP)

(72) Inventors: Mizuki Saito, Tokyo (JP); Fuminori Kobayashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 43 days.

(21) Appl. No.: 15/079,079

(22) Filed: Mar. 24, 2016

(65) Prior Publication Data

US 2016/0289374 A1 Oct. 6, 2016

(30) Foreign Application Priority Data

Mar. 30, 2015 (JP) ................. 2015-070253

(51) Int. Cl.

| C08G 63/08 | (2006.01) |
|---|---|
| B29C 35/08 | (2006.01) |
| B29C 45/00 | (2006.01) |
| B29C 71/00 | (2006.01) |
| B29C 71/02 | (2006.01) |
| C08G 63/06 | (2006.01) |
| B29K 67/00 | (2006.01) |

(52) U.S. Cl.
CPC ...... *B29C 35/0866* (2013.01); *B29C 35/0805* (2013.01); *B29C 71/0009* (2013.01); *B29C 71/02* (2013.01); *C08G 63/06* (2013.01); *B29C 45/0001* (2013.01); *B29C 2035/085* (2013.01); *B29C 2035/0877* (2013.01); *B29K 2067/043* (2013.01)

(58) Field of Classification Search
None
See application file for complete search history.

(56) References Cited

U.S. PATENT DOCUMENTS

2010/0184891 A1 7/2010 Akatsu et al.
2015/0051119 A1 2/2015 Masaki et al.

FOREIGN PATENT DOCUMENTS

| JP | 2003034734 A | 2/2003 | |
|---|---|---|---|
| JP | 2004204195 A | 7/2004 | |
| JP | 2009221413 A | 10/2009 | |
| JP | WO 2013183363 A1 * | 12/2013 | ............ E21B 33/12 |
| WO | 2009034942 A1 | 3/2009 | |
| WO | 2013162002 A1 | 10/2013 | |

OTHER PUBLICATIONS

Hiroyuki (WO 2013/183363 A1); Dec. 2013 (Google Patents—Machine Translation to English).*

* cited by examiner

*Primary Examiner* — David Sample
*Assistant Examiner* — Donald M Flores, Jr.
(74) *Attorney, Agent, or Firm* — Birch, Stewart, Kolasch & Birch, LLP

(57) ABSTRACT

The polyglycolic acid having a content of low molecular weight substance of less than 1% by weight; and a molded article thereof having a thickness of 2 mm or greater, the time at which immersion of the molded article in water at 66° C. is started to the time at which the polyglycolic acid decomposed by the water starts to elute being 1 hour or longer by 30 hours or shorter, and a rate of embrittlement, at which embrittlement proceeds due to the elution of the polyglycolic acid, being 0.025 mm/h or greater.

7 Claims, 1 Drawing Sheet

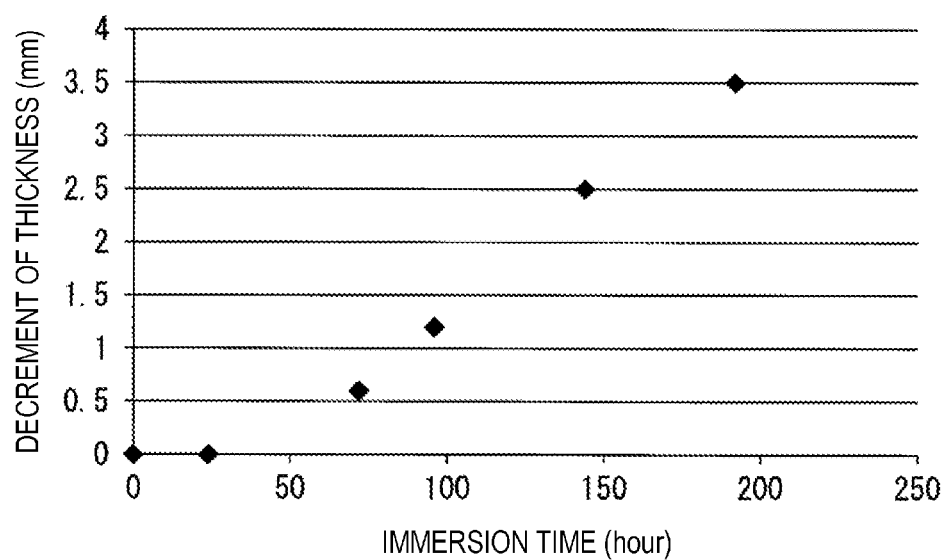

POLYGLYCOLIC ACID MOLDED ARTICLE, COMPONENT FOR DOWNHOLE TOOL, AND METHOD OF PRODUCING POLYGLYCOLIC ACID MOLDED ARTICLE

CROSS-REFERENCE TO RELATED APPLICATIONS

This application claims the benefit of Japanese Patent Application No. 2015-070253 filed Mar. 30, 2015, the disclosure of which is herein incorporated by reference in its entirety.

TECHNICAL FIELD

The present invention relates to a polyglycolic acid molded article, a component, obtained by molding polyglycolic acid, for a downhole tool, and a method of producing a polyglycolic acid molded article.

BACKGROUND ART

Polyglycolic acid has high hydrolyzability as well as excellent gas barrier properties, heat resistance, and mechanical strength. Because of this, polyglycolic acid has been used as raw materials with low environmental load and as molding materials in various fields such as fiber and medical fields.

To obtain polyglycolic acid molded articles with high hydrolyzability and low environmental load, various methods, such as a method of adding a hydrolysis auxiliary agent to polyglycolic acid (Patent Document 1) and a method of subjecting a polyglycolic acid molded article to hydrothermal treatment (Patent Document 2), have been investigated. In these methods, hydrolyzability of polyglycolic acid molded articles is enhanced by selecting or controlling the molecular weight of the polyglycolic acid.

Meanwhile, in production of biodegradable aliphatic polyester molded articles, a method of controlling the molecular weight of the aliphatic polyester by irradiating with radiation such as an electron beam has been investigated.

For example, Patent Document 3 describes fibers formed from a biodegradable polymer that contains a biodegradable aliphatic polyester and polyfunctional triazine compound and that is obtained by crosslinking the aliphatic polyester and the polyfunctional triazine compound by irradiating with radiation.

Patent Document 4 describes a thermolysis-resistant polyester obtained by kneading a biodegradable aliphatic polyester and a polyfunctional monomer and then irradiating with radiation.

Patent Document 5 describes decomposition of a molded plate of polylactic acid having a thickness of 1 mm by using an enzyme liquid after irradiating the molded plate of polylactic acid with an electron beam.

CITATION LIST

Patent Literature

Patent Document 1: WO/2013/162002 (published on Oct. 31, 2013)
Patent Document 2: WO/2009/034942 (published on Mar. 19, 2009)
Patent Document 3: Japanese Unexamined Patent Application Publication No. 2004-204195A (published on Jul. 22, 2004)
Patent Document 4: Japanese Unexamined Patent Application Publication No. 2009-221413A (published on Oct. 1, 2009)
Patent Document 5: Japanese Unexamined Patent Application Publication No. 2003-34734A (published on Feb. 7, 2003)

SUMMARY OF INVENTION

Technical Problem

Polyglycolic acid molded articles with higher hydrolyzability than those of the polyglycolic acid molded articles described in Patent Documents 1 and 2 and low environmental load have been desired.

The aliphatic polyesters described in Patent Documents 3 and 4 have enhanced heat resistance, water resistance, and the like, and do not have high hydrolyzability.

Furthermore, the molded article of polylactic acid described in Patent Document 5 uses an enzyme liquid for hydrolysis.

The invention of the present application has been completed in light of the problems described above, and an object of the present invention is to provide a molded article that has a thickness and that contains a polyglycolic acid having high hydrolyzability without using a hydrolysis auxiliary agent.

Solution to Problem

To solve the problems described above, the polyglycolic acid molded article according to the present invention is a polyglycolic acid molded article comprising polyglycolic acid; the polyglycolic acid having a content of low molecular weight substance of less than 1% by weight; the polyglycolic acid molded article having a thickness of 2 mm or greater, the time at which immersion of the polyglycolic acid molded article in water at 66° C. is started to the time at which the polyglycolic acid decomposed by the water starts to elute being 1 hour or longer but 30 hours or shorter, and a rate of embrittlement, at which embrittlement of the polyglycolic acid proceeds in a thickness direction from a surface part to a center part of the polyglycolic acid molded article due the elution of the polyglycolic acid, being 0.025 mm/h or greater.

In the polyglycolic acid molded article according the present invention, weight average molecular weights of the polyglycolic acids in the surface part and the center part of the polyglycolic acid molded article are preferably in a range of 70,000 to 150,000.

In the polyglycolic acid molded article according to the present invention, a difference between a weight average molecular weight of the polyglycolic acid in the surface part and a weight average molecular weight of the polyglycolic acid in the center part is preferably 30,000 or less.

The polyglycolic acid molded article according to the present invention is irradiated with radiation.

In the polyglycolic acid molded article according to the present invention, the radiation irradiated to the polyglycolic acid molded article is preferably an electron beam or γ-ray.

In the polyglycolic acid molded article according to the present invention, the polyglycolic acid molded article is preferably subjected to hydrothermal treatment by being immersed in hot water before or after irradiation of the radiation.

A component for a downhole tool comprising the polyglycolic acid molded article according to the present invention is also within the scope of the present invention.

The method of producing a polyglycolic acid molded article according to the present invention is a method of producing a polyglycolic acid molded article containing polyglycolic acid, the method comprising the steps of: molding a polyglycolic acid molded article having a thickness of 2 mm or greater by using the polyglycolic acid having a content of low molecular weight substance of less than 1% by weight, and then irradiating the polyglycolic acid molded article with radiation.

In the method of producing a polyglycolic acid molded article according to the present invention, the radiation irradiated to the polyglycolic acid molded article is preferably an electron beam or γ-ray.

Advantageous Effects of Invention

The present invention can provide a molded article that has a thickness and that contains a polyglycolic acid having high hydrolyzability without using a hydrolysis auxiliary agent.

BRIEF DESCRIPTION OF DRAWINGS

FIG. 1 is a graph showing the relationship between immersion time, which is the time used for immersing a polyglycolic acid molded article in water at 66° C., and decrement of thickness of the polyglycolic acid molded article.

DESCRIPTION OF EMBODIMENTS

The polyglycolic acid molded article according to an embodiment of the present invention will be described below in detail. The polyglycolic acid molded article of the present embodiment contains polyglycolic acid.

Polyglycolic Acid

In the present specification, "polyglycolic acid" (simply referred to as "PGA") includes a homopolymer of glycolic acid structural units obtained by polymerizing at least one type of monomer or dimer (glycolide) of glycolic acid as well as copolymers of glycolic acid structural units and other monomers, and types and the number of monomers contained in one resin are not limited.

The PGA used in the polyglycolic acid molded article (PGA molded article) according to the present embodiment is typically preferably a homopolymer of glycolic acid structural units; however, a copolymer of glycolic acid structural units and other monomers may be also used.

Other monomers used in the copolymer may be any monomers as long as the monomers can be copolymerized with glycolic acid and glycolide. Examples thereof include hydroxycarboxylic acids, lactides, and lactones. Examples of the hydroxycarboxylic acids include lactic acid, 2-hydroxyacetic acid, 2-hydroxypropanoic acid, 2-hydroxybutyric acid, 3-hydroxypropanoic acid, 4-hydroxybutanoic acid, and the like. Examples of the lactides include lactide, which is a dimer of lactic acid, and the like. Examples of the lactones include γ-caprolactone, β-propiolactone, β-butyrolactone, and the like.

The PGA may be one type of polymer or a mixture of two or more types of polymers. The content of the glycolic acid structural units in the PGA is preferably 70% by weight or greater, more preferably 90% by weight or greater, and most preferably 98% by weight or greater, and this also applies to the case where a mixture of two or more types of polymers and copolymers are used. That is, the PGA is most preferably composed of glycolic acid structural units. As long as the content of the glycolic acid structural units in the PGA is 70% by weight or greater, high mechanical strength and high hydrolyzability can be imparted to the PGA.

The PGA can be obtained by, for example, ring-opening polymerization of glycolide or ring-opening polymerization of glycolide and at least one of the lactides or lactones.

For example, as catalysts for the ring-opening polymerization, a catalyst, such as organic tin carboxylates, tin halides, and antimony halides, and a co-catalyst, such as phosphoric acid esters, can be used. As the ring-opening polymerization, for example, glycolide is polymerized by adding a little amount of catalyst to the glycolide, and heating at a temperature in a range of 120° C. to 230° C. for a predetermined time. Note that, by using a molecular weight adjusting agent appropriately, the weight average molecular weight of the PGA is preferably adjusted to 70,000 or greater but 500,000 or less. By setting the weight average molecular weight to 70,000 or greater, the PGA having high mechanical strength and, by performing the ring-opening polymerization in this manner, having the content of low molecular weight substance, such as glycolide, of less than 1% by weight can be obtained.

Note that, in the present specification, "low molecular weight substance" refers to a water-soluble compound having a solubility of 1 g or greater per 100 g of water at 66° C. under atmospheric pressure condition, and the low molecular weight substance includes monomers, such as glycolic acid, lactic acid, and lactones, dimers of these, oligomers, and the like that are remained in the PGA obtained by the polymerization.

The PGA contained in the PGA molded article according to the present embodiment has a content of low molecular weight substances which are hydrophilic compounds of less than 1% by weight. By this, PGA that can form a PGA molded article having high mechanical strength and high hydrolyzability can be obtained. Furthermore, initial amount of elution and change in dimension can be suppressed when the PGA molded article is used in water.

Furthermore, the PGA contained in the PGA molded article according to the present embodiment, hydrolysis accelerating auxiliary agents, such as enzymes, are not added. By this, increase in costs due to an increased number of steps during the formation of the PGA molded article can be avoided. Furthermore, contamination of the production devices for producing PGA caused by hydrolysis accelerating auxiliary agents and/or mixing of the hydrolysis accelerating auxiliary agents as contaminants to PGA molded articles of other grade can be avoided.

Note that the PGA may contain, as necessary, a thermal stabilizer, photostabilizer, inorganic filler, plasticizer, end capping agent, and the like in the range that is not contrary to the purpose of the present invention.

Polyglycolic Acid Molded Article

The polyglycolic acid molded article (PGA molded article) according to the present embodiment is molded by subjecting the PGA obtained as described above to a publicly known thermoforming method such as an injection molding, melt-extrusion molding, solidification-extrusion molding, compression molding, stretch molding, and the like. Furthermore, as necessary, the PGA molded article may be formed by cutting. Note that specific aspects and use as a molded article of the PGA molded article according to the present embodiment will be described later. In this section, controlling of weight average molecular weight of the PGA performed by irradiating the PGA molded article with radiation will be described.

The type of the radiation irradiated to the PGA is not particularly limited; however, examples thereof include an α-ray, β-ray, γ-ray, X-ray, electron beam, and the like. From the industrial point of view and/or from the perspective of transparency to the molded article, a γ-ray and electron beam are preferable. When there is a need for treating a molded article in a short time period, an electron beam is preferably irradiated. In order to uniformly treat a thick molded article to the inner part thereof, a γ-ray is preferably irradiated.

For example, when the PGA molded article is treated by irradiating the PGA molded article with an electron beam, the irradiation dose of the electron beam is preferably from 50 kGly to 400 kGly, more preferably 100 kGly to 300 kGly, and most preferably from 170 kGly to 210 kGly. When the irradiation dose of the electron beam is from 50 kGly to 400 kGly, hydrolyzability of the PGA can be enhanced while the weight average molecular weight of the PGA is maintained so that the mechanical strength of the PGA can be maintained.

Note that the acceleration voltage of the electron beam may be an acceleration voltage sufficient to generate an electron beam having the energy that can penetrate the thickness of a sample to be irradiated; however, use of high voltage using a medium to high energy accelerator is preferable. For example, by setting the acceleration voltage of the electron beam to be approximately 4,800 kV, a PGA molded article having the thickness of 1 mm to 20 mm, i.e. a PGA molded article having the thickness of 2 mm or greater, can be uniformly decomposed by irradiation of the electron beam.

The PGA molded article according to the present embodiment is irradiated with an electron beam. By this, hydrolyzability of the PGA molded article can be enhanced. Furthermore, in the PGA molded article, the weight average molecular weight of the PGA is adjusted to be in a range of 70,000 to 150,000 by irradiation of radiation. The weight average molecular weight of the PGA is preferably in a range of 70,000 to 150,000, and more preferably in a range of 70,000 to 130,000. When the weight average molecular weight of the PGA is 70,000 or greater, lowering of mechanical strength of the PGA molded article can be prevented. Furthermore, for example, when the weight average molecular weight of the PGA is 50,000 or greater, conditions where the maintenance of the shape of the molded article becomes difficult due to elution of low molecular weight PGA to water can be prevented. Furthermore, when the weight average molecular weight of the PGA is 150,000 or less, lowering of hydrolyzability of the PGA molded article can be prevented. That is, by irradiating the PGA molded article with radiation, the weight average molecular weight of the PGA of the PGA molded article can be adjusted, and mechanical strength and formability of the PGA molded article are maintained.

Furthermore, since the PGA molded article is formed with a thickness with which uniform penetration of an electron beam is possible, the weight average molecular weights of the PGAs of both the surface part and the center part of the PGA molded article are adjusted to be in a range of 70,000 to 150,000, and the difference between the weight average molecular weight of the PGA in the surface part and the weight average molecular weight of the PGA in the center part of the PGA molded article is adjusted to be 30,000 or less.

Note that the weight average molecular weights of the PGAs in the surface part and the center part of the PGA molded article can be measured by collecting a PGA sample in each part. For example, the weight average molecular weight of the PGA in the surface part is determined by cutting a portion of the PGA at the thickness of 0.5 mm which is from the surface to the inner part of the PGA molded article, and measuring the weight average molecular weight of the cut PGA by gel permeation chromatography (GPC). Furthermore, the weight average molecular weight of the PGA in the center part is determined by, for example, cutting the PGA in a shape of 1.0 mm cube having the center of the PGA molded article as its center, and measuring the weight average molecular weight of the cut PGA by GPC.

The PGA molded article according to the present embodiment have a small difference between the weight average molecular weight of the PGA in the surface part and the weight average molecular weight of the PGA in the center part since the PGA has been uniformly decomposed by the electron beam irradiation to reduce the molecular weight. Because of this, in the PGA molded article according to the present embodiment, hydrolysis of the PGA occurs uniformly from the surface part to the center part of the molded article, and thus the embrittlement of the PGA molded article proceeds. Therefore, the time required to disintegrate the PGA molded article due to the hydrolysis can be accurately estimated.

On the other hand, when the molecular weight of a PGA molded article is lowered by treating the PGA molded article with hot water, for a thick PGA molded article, it is difficult to uniformly control the weight average molecular weight of the PGA in the surface part and the weight average molecular weight of the PGA in the center part, and thus the weight average molecular weight of the PGA in the surface part tends to be smaller than that of the PGA in the center part.

Furthermore, the PGA molded article irradiated with an electron beam exhibits higher hydrolyzability than that of the molded article of PGA in which hydrolyzability is enhanced by adjusting the weight average molecular weight via a molecular weight adjusting agent and that of the molded article of PGA in which hydrolyzability is enhanced by hydrothermal treatment. Furthermore, the PGA molded article irradiated with an electron beam exhibits high hydrolyzability without using an enzyme liquid, such as lipase, as a hydrolysis auxiliary agent. Furthermore, the PGA molded article irradiated with an electron beam exhibits high hydrolyzability even when the PGA does not contain a hydrolysis auxiliary agent. The PGA molded article obtained by performing irradiation of radiation in this manner exhibits high hydrolyzability that cannot be explained solely by the lowering of the molecular weight of the PGA due to the irradiation of radiation. It is surmised that this is due to formation of a component that contributes to accelerate decomposition as a result of specific cutting of the PGA chain by the irradiation of radiation.

Estimation of Time Required to Disintegrate PGA Molded Article

As described above, since the PGA molded article according to the present embodiment is uniformly disintegrated by the electron beam irradiation, hydrolyzabilities of the PGA in the surface part and the center part are uniformly controlled. By this, the time required to disintegrate the PGA molded article can be easily set by forming the PGA to have an effective thickness after specifying the critical thickness of the PGA and by specifying the lead time of the PGA molded article and the rate of embrittlement of the PGA molded article.

Hydrolysis of PGA

Typically, the hydrolyzable resin has higher infiltration rate of water to the molded article formed by the hydrolyzable resin compared to the hydrolysis rate of the resin. In this case, the molded article of the hydrolyzable resin decomposes by bulk decomposition mechanism that decomposes into lumps via hydrolysis. Because of this, rate of reduction in the thickness due to hydrolysis of the resin molded article cannot maintain a fixed rate (linearity), and it is difficult to specify the time required to disintegrate the molded article.

On the other hand, PGA has lower infiltration rate of water compared to the hydrolysis rate of a resin. Because of this, in the PGA molded article, embrittlement of the PGA molded article proceeds by surface decomposition mechanism that hydrolyzes the PGA molded article from the surface part to the inner part. By this, in the PGA molded article, the rate of embrittlement at which embrittlement proceeds due to hydrolysis can maintain a fixed rate (linearity). However, also in the PGA molded article, when the molded article is formed into a thin shape and when the thickness of the part, where embrittlement has not proceeded in the PGA molded article, is reduced after embrittlement of the PGA has proceeded due to the surface decomposition mechanism, the PGA molded article disintegrates by bulk decomposition mechanism due to quick infiltration of water.

Critical Thickness and Effective Thickness

In the PGA molded article, "critical thickness" is defined as a thickness at which the thickness, at which embrittlement of the PGA molded article proceeds from the surface part to the center part due to the surface decomposition mechanism, changes to the thickness, at which disintegration of the PGA molded article starts due to the bulk decomposition mechanisms. In this manner, the PGA molded article embrittles at a fixed rate by the surface decomposition mechanism and then quickly disintegrates after the mechanism changes to the bulk decomposition mechanism.

Furthermore, "effective thickness" refers to a thickness that is equal to or greater than the critical thickness of the PGA molded article. By setting the thickness of the PGA molded article to be equal to or greater than the critical thickness, time required to disintegrate the PGA molded article can be estimated based on the difference between the effective thickness and the critical thickness. That is, the time taken for the thickness of the part where embrittlement of the PGA molded article has not occurred reaches the critical thickness as a result of elution of the PGA due to hydrolysis followed by embrittlement of the PGA molded article proceeds due to decrease in the density thereof is estimated.

When only one face of the PGA molded article is used in an environment where hydrolysis is possible, the effective thickness of the PGA molded article is set to a thickness that is equal to or greater than ½ times the critical thickness. Furthermore, when the both faces of the PGA molded article are used in an environment where hydrolysis is possible, the effective thickness of the PGA molded article is set to a thickness that is equal to or greater than 1 time the critical thickness. Furthermore, the effective thickness is set to a thickness that is equal to or greater than the critical thickness taking mechanical strength or the like that is required to the PGA molded article into consideration.

Note that WO/2013/183363 (Reference Document 1) discloses that the critical thickness of PGA having a weight average molecular weight of 200,000 is 0.812 mm under a condition of being immersed in water at 60° C. The PGA molded article according to the present embodiment has enhanced hydrolyzability by electron beam irradiation and small difference between the weight average molecular weights of the PGAs in the surface part and the center part while the PGA molded article has a thickness of 2 mm or greater. By this, the disintegration time can be suitably estimated even for a molded article that requires the effective thickness to be set at a thickness that is equal to or greater than 2 times the critical thickness (approximately 1 mm) of the PGA.

Lead Time and Rate of Embrittlement

In the present specification, "lead time" refers to the time period between the time at which immersion of the PGA molded part in water at 66° C. is started to the time at which the PGA decomposed by the water starts to elute. More specifically, the lead time is the time period between the time at which immersion of the PGA molded part in water at 66° C. is started to the time at which the PGA in the surface part of the molded article is hydrolyzed and then the hydrolyzed PGA starts to elute in the water. "Embrittlement" refers to the conditions where the hydrolyzed PGA elutes in water and thus the density of the PGA molded article is decreased in the part where the PGA has eluted, thereby embrittling the PGA molded article. Furthermore, in the PGA molded article, the embrittled part where the density is decreased is referred to as "brittle layer". Note that Reference Document 1 described above discloses that the molecular weight which allows PGA to be hydrolyzed to start eluting in water is 50,000.

In the PGA molded article according to the present embodiment, the lead time (hour) between the time at which immersion in water at 66° C. is started to the time at which the PGA decomposed by the water starts to elute is from 1 hour to 30 hours. The lead time of 1 hour to 30 hours is preferable, 5 hours to 30 hours is more preferable, and 10 hours to 30 hours is most preferable. Since the PGA molded article has enhanced hydrolyzability, the lead time may be set to 1 hour to 30 hours.

Furthermore, in the present specification, "rate of embrittlement" refers to a rate at which the embrittlement of the PGA proceeds in the thickness direction from the surface part to the center part of the PGA due to the elution of the PGA. In the PGA molded article according to the present embodiment, hydrolyzability is enhanced by being irradiated with an electron beam. By this, the rate of embrittlement of the PGA molded article is 0.025 mm/h or greater. The rate of embrittlement of the PGA molded article is preferably 0.025 mm/h or greater, and more preferably 0.026 mm/h or greater.

As described above, the PGA molded article according to the present embodiment achieves short lead time and high rate of embrittlement. By this, the PGA molded article according to the present embodiment can be quickly hydrolyzed and can make environmental load even smaller.

Relationship Between Rate of Embrittlement and Rate of Decrease in Thickness

The rate of embrittlement can be specified as a rate of decrease in thickness. The rate of embrittlement is a rate at which the embrittlement of the PGA molded article proceeds from the surface part to the center part, and the rate of decrease in thickness is a rate of decrease in thickness of the part where the embrittlement has not occurred from the surface part to the center part of the PGA molded article. Because of this, the rate of embrittlement and the rate of decrease in thickness are relative rates and result in the same value. Because of this, the rate of embrittlement can be determined as the rate of decrease in thickness that is calculated by measuring, over time, the decrement of the thickness of the part where the embrittlement of the PGA molded article has not occurred, i.e. the rest of part after removing the brittle layer. Therefore, the rate of embrittlement is determined below as the rate of decrease in thickness based on the decrement of the thickness.

The lead time and the rate of decrease in thickness are determined by plotting the relationship between the time used to immerse the PGA molded article in water at 66° C. and the decrement of thickness of the PGA molded article on a two-axis coordinate system. For example, the relationship between the immersion time X and the decrement of thickness Y of the PGA molded article is plotted by setting the immersion time on the x-axis and the decrement of thickness of the PGA molded article on the y-axis. Note that, when the surface of the PGA molded article has not embrittled, the decrement of thickness Y=0 regardless of the value of the immersion time X. That is, for the plot of lead time, a straight line of Y=0 is obtained. On the other hand, when the surface of the PGA molded article starts to embrittle, the decrement of thickness Y increases as the immersion time X elapses. The approximation straight line for the relationship between the immersion time X and the decrement of thickness Y is determined, and the slope thereof is determined as the rate of decrease in thickness. Furthermore, taking the intersection of the straight line of Y=0 and the approximation straight line for the relationship between the immersion time X and the decrement of thickness Y as the point where the surface of the PGA molded article started to embrittle, the lead time is determined as the time to the immersion time X, at which the intersection point is located. Based on the lead time and the rate of decrease in thickness of the PGA molded article as described above and the effective thickness and the critical thickness of the PGA molded article, the time required to disintegrate the PGA molded article by the immersion in water is estimated. For more specific methods for specifying the lead time and the rate of decrease in thickness, refer to the section of "Evaluation of degradability" in working examples.

Component for Downhole Tool

The component for a downhole tool according to the present embodiment is a component, comprising the PGA molded article according to the present embodiment, for a downhole tool.

As described above, the PGA molded article according to the present embodiment can form a molded article having high mechanical strength since the PGA molded article has a thickness of 2 mm or greater, which is a thickness equal to or greater than 2 times the critical thickness. Because of this, the PGA molded article can be suitably used as a component for a downhole tool, such as a frac plug, bridge plug, cement retainer, perforation gun, ball sealer, isolation plug, or packer, that is used for completing a downhole (underground borehole) for recovering hydrocarbon resources, such as petroleum and gas, or for repairing a downhole. Note that the component for a downhole tool according to the present embodiment achieves short lead time and fast rate of decrease in thickness. Therefore, the component for a downhole tool can be disintegrated in a downhole and hydrolyzed immediately after being used, thereby decreasing troubles in production and making environmental load smaller.

Method of Producing PGA Molded Article

The method of producing a polyglycolic acid molded article (PGA molded article) according to the present invention is a method of producing a PGA molded article containing PGA, the method comprising the steps of: molding a polyglycolic acid molded article having a thickness of 2 mm or greater by using the polyglycolic acid having a content of low molecular weight substance of less than 1% by weight, and then irradiating the polyglycolic acid molded article with radiation. Furthermore, the radiation is preferably an electron beam or γ-ray.

According to the configuration described above, the PGA molded article according to the present invention can be suitably produced. Therefore, the method of producing the PGA molded article according to the present invention is also within the scope of the present invention.

PGA Molded Article According to Other Embodiments

The PGA molded article according to the present invention is not limited to the embodiment described above. For example, the PGA molded article according to another embodiment contains a hydrophilic compound that promotes hydrolyzability. According to the configuration described above, hydrolyzability of the PGA molded article can be further enhanced.

The PGA may contain, as necessary, glycolic acid, glycolide, lactides, lactones, and oligomers of these, as well as another hydrophilic compound, as long as the total amount of these with the low molecular weight substances of the PGA, which are hydrophilic compounds, is less than 1% by weight. These hydrophilic compounds act as hydrolysis auxiliary agents when compounded in the PGA. Note that another hydrophilic compound includes a compound having a solubility of 1 g or greater per 100 g of water at 66° C. under atmospheric pressure condition and a compound that is converted to a compound satisfying this solubility requirements by hydrolysis.

Examples of other hydrophilic compounds include water-soluble polymers, such as polyvinyl alcohol and polyethylene glycol, carboxylic acid anhydrides, cyclic esters, and the like. Preferable examples of the carboxylic acid anhydride include aliphatic monocarboxylic acid anhydrides (preferably those having two alkyl groups having from 6 to 20 carbons) such as hexanoic anhydride, octanoic anhydride, decanoic anhydride, lauric anhydride, myristic anhydride, palmitic anhydride, and stearic anhydride; aromatic monocarboxylic acid anhydrides such as benzoic anhydride; aliphatic dicarboxylic acid anhydrides (preferably those having saturated or unsaturated hydrocarbon chains with 2 to 20 carbon atoms) such as succinic anhydride and maleic anhydride; aromatic dicarboxylic acid anhydrides such as phthalic anhydride; aromatic tricarboxylic acid anhydrides such as trimellitic anhydride; alicyclic dicarboxylic acid anhydrides such as tetrahydrophthalic anhydride; aliphatic tetracarboxylic dianhydrides such as butanetetracarboxylic dianhydride; and aromatic tetracarboxylic dianhydrides such as 3,3',4,4'-benzophenonetetracarboxylic dianhydride, diphenylsulfonetetracarboxylic dianhydride, biphenyltetracarboxylic dianhydride, ethylene glycol bisanhydrotrimellitate, and glycerin bisanhydrotrimellitate monoacetate. That is, the carboxylic acid anhydride preferably contains at least one type selected from the group consisting of these. Carboxylic acid anhydrides having a cyclic structure are more preferable, and aromatic monocarboxylic acid anhydrides, aromatic dicarboxylic acid anhydrides, aromatic tricarboxylic acid anhydrides, and aromatic tetracarboxylic acid dianhydrides are even more preferable. From the perspectives of formability, phthalic anhydride, trimellitic anhydride, 3,3',4,4'-benzophenonetetracarboxylic dianhydride (hereinafter, also referred to as "BTDA") are particularly preferable. One type of these carboxylic acid anhydrides may be used alone or two or more types of these carboxylic acid anhydrides may be used in combination. In the PGA, contamination of devices for producing the PGA due to the hydrophilic compounds contained in the PGA can be prevented by setting the content of the hydrophilic compounds composed of low molecular weight substances remained in the PGA and the hydrophilic compounds blended to the PGA to be less than 1% by weight. By this, when PGA of other grades are produced using the same device, it is possible to prevent the hydrophilic compound, which has contaminated the device, to be contained in the PGA of other grades as contaminants.

The PGA molded article according to the present invention is not limited to the embodiment described above. For example, a PGA molded article according to yet another embodiment has been subjected to hydrothermal treatment by being immersed in hot water before or after irradiation of the PGA molded article with an electron beam. According to the configuration described above, hydrolyzability of the PGA molded article can be further suitably enhanced. Note that the hydrothermal treatment to the PGA molded article is performed under temperature condition and treatment time in the ranges that do not cause embrittlement of the PGA molded article, taking the hydrolyzability of the PGA molded article as well as presence or absence of electron beam irradiation to the PGA molded article into consideration. The temperature condition where the hydrothermal treatment is performed on the PGA molded article is in a range of 40° C. to 100° C., and the treatment time is in a range of 1 hour to 200 hours. The hydrothermal treatment is performed under condition where the PGA molded article does not embrittle by adjusting the treatment time depending on the temperature condition. By this, hydrolyzability of the PGA molded article can be enhanced without causing embrittlement of the PGA molded article.

Furthermore, the present invention is not limited to the embodiments described above, and various modifications are possible within the scope indicated in the claims. Embodiments obtained by appropriately combining the technical means disclosed by the various embodiments are also included in the technical scope of the present invention.

EXAMPLES

Production of PGA Molded Article

PGA molded articles that have undergone electron beam irradiation were produced as Working Example 1 and Working Example 2, and PGA molded articles that have not undergone electron beam irradiation were produced as Comparative Examples 1 to 3.

Formation of PGA Molded Article

Working Examples 1 and 2

As Working Example 1, a PGA molded article in a cube shape in which each side was 7 mm was obtained by injection-molding Kuredux 100R35 (manufactured by Kureha Corporation), which was a pellet-like PGA, using the Si-50 plastar (injection molding machine; manufactured by Toyo Seiki Seisaku-sho, Ltd.). From one face of the obtained PGA molded article, an electron beam was irradiated in a condition of 170 kGly under atmospheric condition to produce a PGA molded article of Working Example 1.

As Working Example 2, a PGA molded article was produced in the same conditions as those in Working Example 1 except for irradiating the electron beam in a condition of 210 kGly.

In Working Examples 1 and 2, the electron beam irradiation was performed by placing a PGA molded article on stacked cardboard and the PGA molded article placed on the cardboard was placed on a cart exclusive for electron beam irradiation. The irradiation dose of the electron beam was measured by a dosimeter placed on the PGA molded article. The Dynamitron electron accelerator (manufactured by RDI) was used as an electron beam irradiation device, and the CTA dosimeter FTR-125 (manufactured by Fujifilm Corporation) was used as a dosimeter. Note that the acceleration voltage of the electron beam was 4,800 kV.

Comparative Examples 1 to 3

As Comparative Example 1, a PGA molded article was produced in the same conditions as those in Working Example 1 except that the electron beam irradiation was not performed. As Comparative Example 2, a PGA molded article was produced in the same conditions as those for the PGA molded article of Comparative Example 1 except for adding water in a manner that the content of water was 300 ppm relative to the pellet-like PGA.

As Comparative Example 3, a PGA molded article was produced by immersing the entire PGA molded article, which was formed in the same conditions as those for the PGA molded article of Comparative Example 1, in deionized water at 80° C., maintaining this condition for 10 hours, and then taking out the PGA molded article from the deionized water to dry at room temperature. Note that, for the PGA molded article of Comparative Example 3, it was visually confirmed that the surface of the PGA molded article was not brittle after the production.

Evaluation of PGA Molded Article

Molecular weight measurement for the PGA in the surface part and the PGA in the center part and evaluation of degradability of the PGA molded article were performed for the PGA molded articles of Working Examples 1 and 2 and for the PGA molded articles of Comparative Examples 1 to 3.

Molecular Weight Measurement

For each of the PGA molded articles of Working Examples 1 and 2 and Comparative Examples 1 to 3, portions of PGAs located at the surface part and the center part of a PGA molded article were cut out as separate samples, and each of the cut PGA was subjected to molecular weight measurement using GPC. The PGA in the surface part was obtained by cutting out a part of the PGA in the range from the surface to 0.1 mm inward of the PGA molded article. Furthermore, the PGA in the center part was obtained by cutting out a part of the PGA in a shape of 1.0 mm cube having the center of the PGA molded article as its center. Note that the cutting out of the PGA was performed using nippers.

A sample solution for the molecular weight measurement was prepared by dissolving approximately 10 mg of the PGA in 0.5 mL of dimethyl sulfoxide (DMSO) while being heated to 150° C., cooling the mixture to room temperature, and diluting the obtained DMSO solution of the PGA to 10 mL using hexafluoroisopropanol (HFIP). The conditions for the molecular weight measurement are as described below.

Molecular weight measurement device: Shodex GPC-104 (manufactured by Showa Denko K.K.)
(detector: RI; column: HFIP-606 m×2)
HFIP solution of CF3COONa (CF3COONa concentration: 5 mM)
Reference material: Polymethyl methacrylate (PMMA)

Evaluation of Degradability

A plurality of PGA molded articles were formed according to the production conditions of each of Working Examples 1 and 2 and Comparative Examples 1 to 3, and degradability was evaluated by the following conditions. The evaluation of degradability was performed by evaluating the lead time and the rate of decrease in thickness.

A plurality of the PGA molded articles was immersed in a manner that the entire PGA molded articles were immersed in deionized water at 66° C. and that the concentration of the PGA molded articles relative to the deionized water was 5% by weight, and then the PGA molded article was taken out one at a time as predetermined time elapses, and dried overnight in a drying chamber at 23° C. (dew point: −40° C.). For each of the dried PGA molded articles, the brittle layer which was formed by the embrittlement of the PGA of the surface part due to hydrolysis was removed. As the thickness of the part where the embrittlement of the PGA molded article has not occurred, the thicknesses in three directions of the cube of the PGA molded article, in which the brittle layer was removed, were measured, and the average value thereof was employed. The decrement of thickness of the PGA molded article was determined from the difference between the thickness of the PGA molded article determined prior to the evaluation of degradability and the thickness of the part where the embrittlement of the PGA molded article has not occurred. Note that the brittle layer was removed by scraping the layer off using a utility knife.

FIG. 1 shows a graph in which the relationship between the immersion time in water at 66° C. and the decrement of thickness of the PGA molded article of Comparative Example 1 has been plotted. Furthermore, Table 1 shows the plotted data, the slope and intercept of the approximation straight line obtained based on the plotted data after 72 hours, and the lead time determined by the approximation straight line.

TABLE 1

| | Immersion time (hour) | | | | | | Inter- | Lead |
|---|---|---|---|---|---|---|---|---|
| | 0 | 24 | 72 | 96 | 144 | 192 | Slope | cept | time |
| Decrement of thickness (mm) | 0 | 0 | 0.6 | 1.2 | 2.50 | 3.50 | 0.0244 | −1.13 | 46.2 |

As shown in FIG. 1, the decrement of thickness was 0 mm at the immersion time of 0 hours and 24 hours. Based on the plotted data at 0 hours and 24 hours, it was confirmed that there was Y=0, i.e. the lead time in which the embrittlement of the PGA molded article had not proceeded. Furthermore, from the decrement of thickness at the immersion time of 72 hours to 192 hours, the approximation straight line (regression line) expressed in formula (1) below was obtained by the least squares method.

$$Y=0.0224X-1.13 \quad (1)$$

By substituting Y=0 in formula (1) above, it was determined that the intersection of the x-axis and y-axis, i.e. the lead time, was 46 hours (extrapolation to zero).

For each of the PGA molded articles of Working Examples 1 and 2 and Comparative Examples 2 and 3, a similar graph as that of the PGA molded article of Comparative Example 1 was created to determine the rate of decrease in thickness (mm/h) from the slope of the approximation straight line. Furthermore, the intersection of the approximation straight line and the line of plotted data having the decrement of thickness of 0 was determined as the lead time (h) until decrease in the thickness of the PGA molded article started.

In Table 2 below, the treatment conditions of the PGA molded articles, the weight average molecular weight, and the evaluation results of degradability of Working Examples 1 and 2 and Comparative Examples 1 to 3 are shown. Note that the evaluation results for Working Examples 1 and 2 and Comparative Example 1 were an average value of two evaluation results obtained under the same conditions.

TABLE 2

| | | Composition | Irradiation dose of electron beam (kGly) | Hydrothermal treatment (° C./h) | Weight average molecular weight | | Lead time (h) | Rate of decrease in thickness (mm/h) |
|---|---|---|---|---|---|---|---|---|
| | | | | | Surface part | Center part | | |
| Working Examples | 1 | PGA | 170 | — | 114,000 | 124,000 | 12 | 0.026 |
| | 2 | PGA | 210 | — | 112,000 | 118,000 | 13 | 0.029 |
| Comparative Examples | 1 | PGA | — | — | 170,000 | 170,000 | 46 | 0.024 |
| | 2 | PGA | — | — | 120,000 | 118,000 | 33 | 0.024 |
| | 3 | PGA | — | 80/10 | 128,000 | 165,000 | 35 | 0.024 |

As shown in Table 2, when the PGA molded articles of Working Examples 1 and 2 and the PGA molded article of Comparative Example 1 are compared, the weight average molecular weights of the PGAs in the surface part and the center part were lowered from 170,000 to approximately 120,000 by performing the electron beam irradiation. The lowered weight average molecular weights are approximately the same level as the weight average molecular weights in the PGA molded article of Comparative Example 2, which contained 300 ppm of water. Furthermore, in the PGA molded article of Comparative Example 3 in which hydrothermal treatment was performed, although the weight average molecular weight in the surface part was lowered from 170,000 to 128,000, the weight average molecular weight in the center part was only lowered from 170,000 to approximately 165,000. From these results, it was confirmed that, in the same manner as in the case where the PGA contains water, the weight average molecular weights in the surface part and the center part of the PGA molded article can be uniformly lowered by irradiating an electron beam to the PGA molded article. It was also confirmed that the weight average molecular weights of the PGAs in the surface part and the center part can be uniformly lowered than the method of lowering weight average molecular weights of the PGAs by the hydrothermal treatment.

When the PGA molded articles of Working Examples 1 and 2 and the PGA molded article of Comparative Example 2 are compared, although the weight average molecular weights of the PGA in the surface part and the center part were roughly the same, the lead times in Working Examples 1 and 2 were 20 hours shorter than the lead time in Comparative Example 2. That is, when the lead time of the PGA molded article of Comparative Example 1, which was an untreated PGA molded article, is taken as a reference, the reduction in the lead times of the PGA molded articles in Working Examples 1 and 2 were significant, i.e. reduction by 33 hours, compared to the 13-hour reduction in the lead time of the PGA molded article in Comparative Example 2. Similarly, the lead times of the PGA molded articles in Working Examples 1 and 2 were shorter than that of the PGA molded article of Comparative Example 3, in which the hydrothermal treatment was performed. From these results, it was confirmed that the lead time was even more shortened in the PGA molded article in which the weight average molecular weight was controlled by the electron beam irradiation compared to the PGA molded article in which the weight average molecular weight of the PGA was controlled using water.

Furthermore, when the rates of decrease in thickness in Working Example 1 and Working Example 1 are compared taking the PGA molded article of Comparative Example 1, which was an untreated PGA molded article, as a reference, the rates of decrease in thickness in Working Example 1 and Working Example 2 were higher than the rate of decrease in thickness in Comparative Example 1. On the other hand, no changes were observed for the rates of decrease in thickness in Comparative Examples 1 to 3. From these results, it was confirmed that the rate of decrease in thickness of the PGA molded article can be made higher by irradiating an electron beam to the PGA molded article.

INDUSTRIAL APPLICABILITY

The present invention can be utilized as a polyglycolic acid molded article in, for example, a downhole tool for recovering hydrocarbon resources.

The invention claimed is:

1. A polyglycolic acid molded article comprising polyglycolic acid;
the polyglycolic acid having a content of low molecular weight substance of less than 1% by weight;
the polyglycolic acid molded article having a thickness of 2 mm or greater,
the time at which immersion of the polyglycolic acid molded article in water at 66° C. is started to the time at which the polyglycolic acid decomposed by the water starts to elute being 1 hour or longer but 30 hours or shorter, and
a rate of embrittlement, at which embrittlement of the polyglycolic acid proceeds in a thickness direction from a surface part to a center part of the polyglycolic acid molded article due the elution of the polyglycolic acid, being 0.025 mm/h or greater.

2. The polyglycolic acid molded article according to claim 1, wherein weight average molecular weights of the polyglycolic acids in the surface part and the center part of the polyglycolic acid molded article are in a range of 70,000 to 150,000.

3. The polyglycolic acid molded article according to claim 2, wherein a difference between a weight average molecular weight of the polyglycolic acid in the surface part and a weight average molecular weight of the polyglycolic acid in the center part of the polyglycolic acid molded article is 30,000 or less.

4. The polyglycolic acid molded article according to claim 1, wherein the polyglycolic acid molded article is irradiated with radiation.

5. The polyglycolic acid molded article according to claim 4, wherein the radiation irradiated to the polyglycolic acid molded article is an electron beam or γ-ray.

6. The polyglycolic acid molded article according to claim 4, wherein the polyglycolic acid molded article is subjected to hydrothermal treatment by being immersed in hot water before or after irradiation of the radiation.

7. A component for a downhole tool comprising the polyglycolic acid molded article described in claim 1.

* * * * *